United States Patent [19]

MacKelvie et al.

[11] 3,758,845
[45] Sept. 11, 1973

[54] SIGNAL TRANSMITTING SYSTEM FOR ROTATING APPARATUS

[75] Inventors: John Stewart MacKelvie, Keene, Ontario; Ganton Webster Clarke, Bailieboro, Ontario, both of Canada

[73] Assignee: Canadian General Electric Company Limited

[22] Filed: Nov. 1, 1971

[21] Appl. No.: 194,378

Related U.S. Application Data
[62] Division of Ser. No. 52,376, July 6, 1970, abandoned.

[30] Foreign Application Priority Data
May 12, 1969  Canada .............................. 51,176

[52] U.S. Cl. ................. 323/51, 336/120, 336/121, 336/123, 340/195, 340/210
[51] Int. Cl. ........................................... H02p 13/00
[58] Field of Search ................... 336/120, 122, 123; 340/194, 195, 207, 177; 324/127; 323/51

[56] References Cited
UNITED STATES PATENTS

| | | | |
|---|---|---|---|
| 3,268,880 | 8/1966 | Miller | 340/207 |
| 3,530,449 | 9/1970 | Anderson | 340/177 |
| 1,500,082 | 7/1924 | Davies et al. | 336/120 X |
| 1,543,994 | 6/1925 | Ferguson | 336/122 |
| 1,639,044 | 8/1927 | Mansbridge | 336/123 |
| 3,090,933 | 5/1963 | Baudot | 336/123 X |
| 2,921,280 | 1/1960 | Litwin et al. | 336/123 X |

FOREIGN PATENTS OR APPLICATIONS
221,939 5/1910 Germany ........................... 336/123

*Primary Examiner*—Gerald Goldberg
*Attorney*—John J. Kissane et al.

[57]            ABSTRACT

This invention relates to a rotary transformer having both windings prewound in a flat rectangular skein for transmitting signals between the rotor and stator of a dynamoelectric machine. Suitably, one skein is wrapped flatwise around, and secured to, the rotor shaft with the second skein being fixedly secured to the stator in a concentric attitude relative to the first skein to permit rotary transformer action between the skeins. In a second disclosed embodiment both rectangular skeins are bent in an arcuate configuration about the rotor axis and are disposed in parallel planes at displaced locations along the axis of rotation. The two coils are designed such that they are coupled inductively at all times during rotation of the rotor.

3 Claims, 4 Drawing Figures

INVENTORS
JOHN S. MAC KELVIE
GANTON W. CLARKE
BY
THEIR ATTORNEY

PATENTED SEP 11 1973 3,758,845

INVENTOR.
JOHN S. MAC KELVIE
GANTON W. CLARKE
BY
*John J. Kissane*
THEIR ATTORNEY

SIGNAL TRANSMITTING SYSTEM FOR ROTATING APPARATUS

This is a divisional application of U.S. Pat. application No. 52,376, filed July 6, 1970, now abandoned.

This invention relates to inductive couplings for transmitting electric signals between a rotor and a stator of rotating apparatus.

In rotating machines such as large electric motors and generators, it is often desirable to transmit electric signals to or from the rotor of the machine without using slip rings and brushes. This has been done by means of a transformer having coaxial helical windings wherein one winding is stationary and the other rotates with the rotor coaxially therewith. In this particular transformer, the rotating winding is wound helically around a surface of revolution of the rotor into a multi-turn coil so that the axis of the helix coincides with the axis of the rotation of the rotor, and the stationary winding is also wound helically into a multi-turn coil which is located coaxially with respect to the rotating coil in spaced relation so that a small clearance remains between the two coils. It has been found that this type of rotating transformer is usually difficult and time consuming to install or replace, particularly on machines already in service.

Therefore, the object of this invention is to provide a simple inductive coupling which is easily installed or replaced and yet serves essentially the same purpose as do prior art couplings.

An inductive coupling for a rotating machine according to the invention consists essentially of at least two coils, each one of which is wound in the form of a complete loop having one or more turns. One coil is wrapped around at least a portion of a surface of revolution on the rotor (e.g., the rotor shaft in the case of a large machine) and secured to the rotor for rotation therewith. The other coil is shaped to conform generally with the shape of the first coil and is secured in a stationary position opposite it in spaced relation so as to leave a small gap between the two coils in all relative positions thereof. Both loops may be wound on a flat surface and then bent in the plane of the surface into the desired curvature. The two coils are designed such that they are coupled inductively at all times during rotation of the rotor. Both coils are connected to equipment of the signaling system; the equipment connected to the first coil is mounted on the rotor and rotates with it, and the equipment connected to the second coil is located on or near the stator of the machine. This type of inductive coupling is sometimes referred to as a "rotary transformer."

This invention will now be described in more detail with reference to the accompanying drawings, in which.

Figure 1:
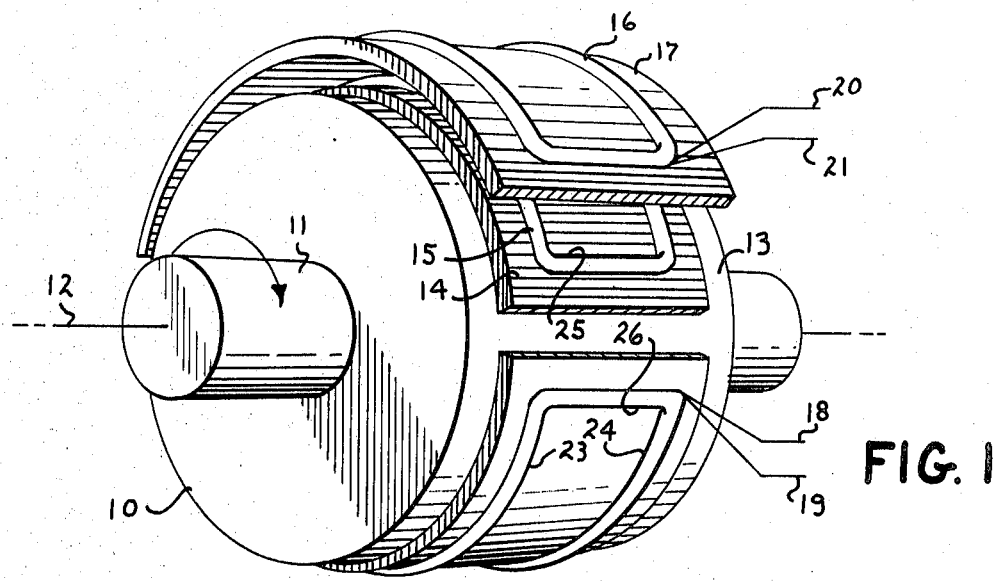
FIG. 1 is a simple illustration of the invention in perspective.

In FIG. 1 there is shown a cylindrical rotor 10 supported on a shaft 11 for rotation on axis 12. During rotation the rotor generates a surface of revolution 13, which in this particular instance is also the peripheral surface of the rotor. A sheet of insulation 14 is wrapped around the peripheral surface of the rotor, and a coil 15 is laid over the insulation, the insulation and coil conforming in curvature with the surface. The coil and insulation are firmly secured to the rotor for rotation therewith by some appropriate means such as banding. A suitable way of securing the coil and insulation to the rotor is to wrap a layer or two of resin impregnated fiber glass roving tightly around the assembly of coil, insulation and rotor and then cure the resin by the addition of a little heat to produce a strong band of resin reinforced with glass fibers. Another coil 16 is supported on a rigid sheet of insulation 17, which may be mounted on the stator of the machine in a stationary position. This assembly of coil 16 and insulation 17 is curved to conform generally with the surface of revolution 13 and is spaced a short distance from coil 15 and insulation 14 so that there is always some clearance between them during rotation of the rotor. Leads 18 and 19 of coil 15 are connected to equipment which is mounted on rotor 10 so as to rotate with it, and leads 20 and 21 of coil 16 are connected to equipment which is mounted on the stator or outside the machine. In the case of a large machine such as a synchronous motor or generator, the surface of revolution 13 will probably be the rotor shaft, or the rotor apart from the shaft, e.g., the field pole structure. For purposes of this invention, surface 13 may be any convenient surface of revolution, for example, the rotor itself, its shaft, or an auxiliary component.

Coil 15 may be wound on a flat surface as a rectangular loop of a plurality of turns of insulated magnet wire. This loop has a pair of relatively long sides 23 and 24 and a pair of relatively short ends 25 and 26. Each one of the long sides 23 and 24 of the loop is then bent into an arc of a circle having its center on axis 12 so that the coil sides fit down onto the sheet of insulation 14 wrapped around the rotor. In this position the straight short ends 25 and 26 also lie down on the sheet of insulation approximately parallel to axis 12. Coil 16 may be made in the same way to the same shape with a pair of long sides which curve around the rotor in radially spaced relation to the long sides of coil 15. It is supported in this position by means of the rigid member 17. Neither the dimensions of the individual coils nor the relative sizes of the coils is in any way critical. It will be noted from FIG. 1 that coil 15 is shown embracing most of the periphery of the rotor and that coil 16 embraces roughly one half this periphery. The arcuate span of these coils around the periphery of the rotor is not critical; it may be more or less than a full circle, preferably less. It is, however, important that the relative coil sizes and the arcuate span of one coil in relation to the other be such that the mutual inductance does not fall below a certain minimum value during rotation of the rotor. The degree of coupling needed will, of course, depend on the nature of the signal energy to be transmitted between coils. It may be enhanced by the use of a suitable magnetic core, e.g., a ferrite material.

Figure 2:
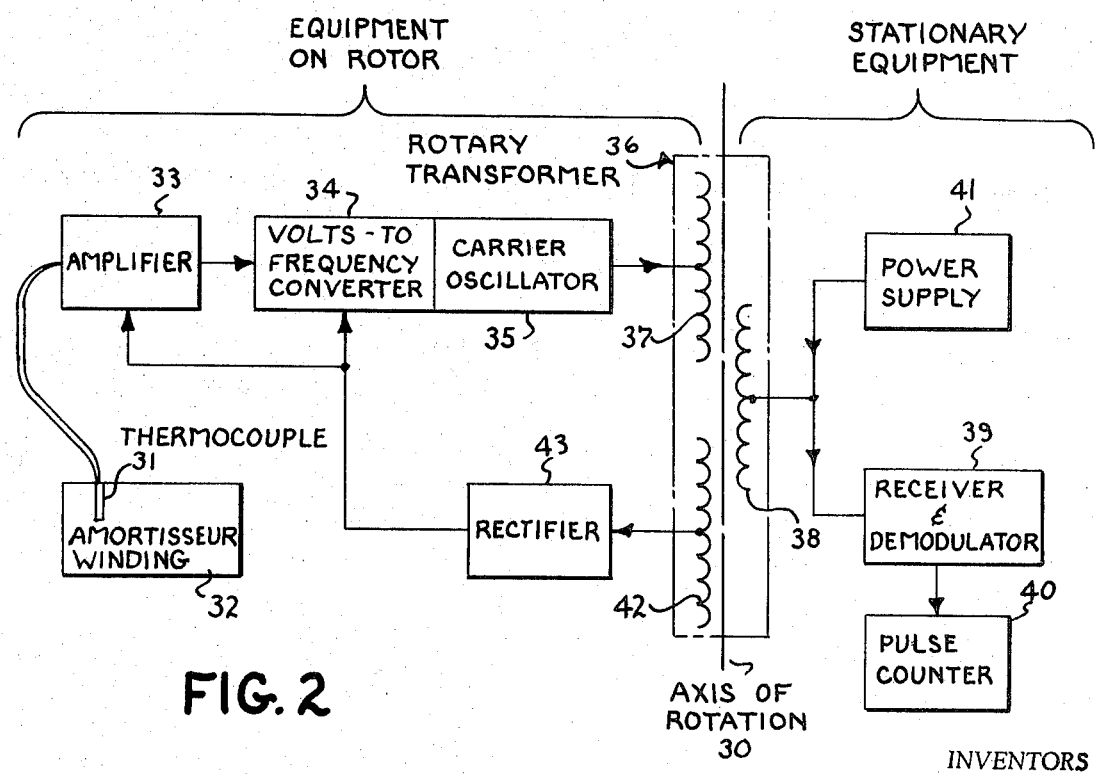
FIG. 2 is a circuit diagram illustrating an application of the invention.

FIG. 2 illustrates one of a number of practical applications for a rotary transformer of the kind shown in FIG. 1 and described above. In these applications control and/or alarm signals can be communicated between the stator and the rotor of rotating equipment such as dynamoelectric machines. For example, such quantities as temperature, pressure, strain, flux, voltage, and current can be measured on the rotor and transmitted to stationary equipment where the signals can be used for monitoring, control or alarm purposes. Another use for this type of rotary transformer is to transmit firing pulses to thyristors mounted on the rotor of a machine.

An amortisseur bar over-temperature protective system will now be described briefly. AC synchronous motors have rotor bars which carry abnormal currents at slip frequencies during starting only, i.e., for accelerating the motor and connected load to synchronous speed where the DC field current is applied. Since the high bar current is present for a very short time, the amortisseur winding is usually designed with a thermal capacity just sufficient for two or three starts in succession. Serious overheating is to be expected if more starts than this are made without a cooling down period. FIG. 2 illustrates very simply a system for detecting the temperature in the amortisseur winding of a synchronous motor.

In FIG. 2, the components shown on the left side, of the vertical dashed line 30, i.e., the line designated "Axis of Rotation," are carried on the rotor, and those on the right side are stationary, e.g., the transformer winding is mounted on the stator and the other components in a cabinet. A thermocouple 31 senses the temperature of amortisseur winding 32 and feeds a DC signal representing temperature to amplifier 33 where it is amplified. A converter 34 then converts the output from the amplifier from DC volts to an alternating current signal of frequency proportional to volts. Next a carrier oscillator 35 produces a carrier wave and modulates it with the alternating current signal. Then the combined signal is applied to the rotating coil 37 of a rotary transformer 36. The signal appearing in coil 37 is picked up by the stationary coil 38 of the transformer and from here passed along to a receiver and demodulator 39 where it is demodulated. The demodulated signal is then applied to a pulse counter 40 which counts the pulses and gives a reading representing the temperature of winding 32. A power supply 41 provides power for receiver-demodulator 39, carrier oscillator 35, volts-to-frequency converter 34, and amplifier 33. This power is transmitted at a relatively high frequency to the rotating components 35, 34 and 33 by way of stationary transformer coil 38 and a second rotating coil 42 which is connected to the components by way of a rectifier 43 in which the AC is converted to DC. In the transmission system, coil 37 acts as a transmitter, coil 42 as a receiver, and coil 38 as both a receiver and transmitter in that it receives the thermocouple signal transmitted by coil 37 and transmits power to coil 42 for use in components 33 to 35.

Figure 3:
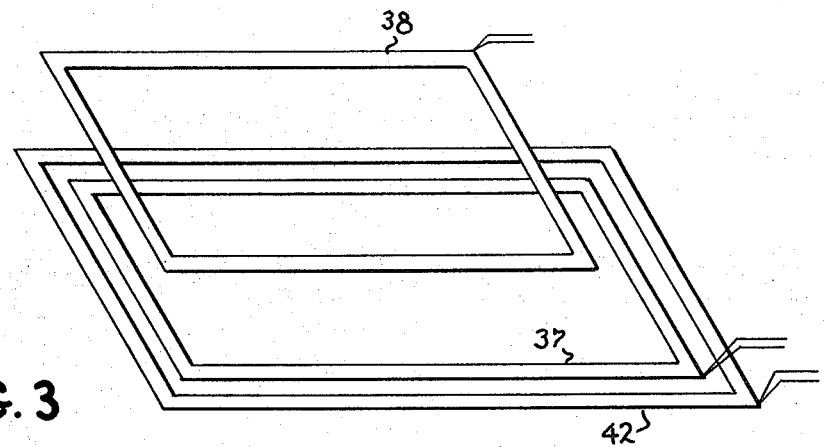
FIG. 3 is a diagram of the coils used in FIG. 2.

A layout in the flat of coils 37, 38 and 42 is shown in FIG. 3. Coil 42 takes the same position on the surface of revolution as does coil 15 in FIG. 1, and coil 37 is located inside it on the surface. Both coils are bent out of their initial flat formation on their long sides to the curvature of the surface of revolution of the rotating member on which they are mounted. The stationary coil 38 corresponds with coil 16 in FIG. 1.

Figure 4:
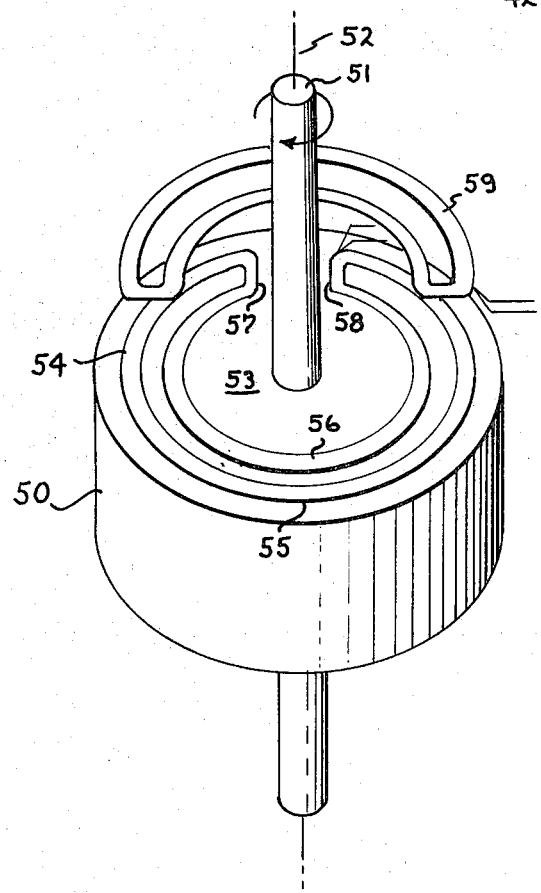
FIG. 4 is another illustration like FIG. 1 showing a variation of the invention.

Instead of using a cylindrical surface of revolution such as that illustrated in FIG. 1, it is also possible to use the rotary transformer with other surfaces, as for example, conical surfaces rotatable on the axis of the cone, or plane surfaces normal to the axis of rotation. FIG. 4 illustrates the latter. In this figure rotor 50 is supported on a shaft 51 for rotation on an axis 52 and has a plane surface 53 on its upper end normal to the axis. A flat, thin, circular coil 54 resembling a horse shoe in outline is laid flatwise on surface 53 somewhere near concentric with respect to axis 52. This coil, like coil 15 of FIG. 1, is a multi-turn loop of magnet wire wound so as to have long circular sides 55, 56 and short ends 57, 58. It is secured to the surface, as by means of a strong adhesive, and rotates with the surface. The stationary coil 59 is a similar coil spaced axially a short distance directly above coil 54 so that there is a clearance between the two for all angular positions of the rotor. This coil may be supported on a flat stator surface located above surface 53 in parallel spaced relation. It has an arcuate length great enough to always maintain a specified minimum amount of mutual inductive coupling between it and coil 54 during rotation of the rotor.

It is now believed to be evident to those skilled in the art that rotary transformers according to this invention can be made and applied in a number of configurations, all of which offer certain advantages over the prior art coaxial transformers. Unlike the prior art transformer which is very difficult to fit on a machine except during manufacture, this transformer can be readily fitted either during manufacture or after the machine has gone into service. It is also well adapted for use on older machines that are being improved upon.

The embodiments of the invention in which an exclusive property or privilege is claimed are defined as follows:

1. A signal transmitting system for a dynamoelectric machine comprising a first coil formed of a plurality of turns of an electrical conductor wound in the form of a complete loop, said coil being laid flat upon a substantially cylindrical rotor surface disposed concentrically about the axis of the rotor, two opposite sides of said coil being arcuately disposed about said rotor axis at axially spaced locations along said cylindrical surface, a second coil formed of a plurality of turns on an electrical conductor wound in the form of a complete loop, said second coil being laid flat upon an arcuately shaped stator surface concentrically disposed about the cylindrical rotor surface, two opposite sides of said second coil being arcuately disposed about said rotor axis at axially spaced locations along said stator surface, one said coil having an arcuate length and disposition relative to the other said coil to continuously maintain at least a pre-determined amount of mutual inductive coupling between said first and second coils during rotation of said rotor, means mounted upon said rotor for generating an electrical signal indicative of a predetermined physical characteristic of said rotor, means connecting said signal generating means to said first coil to transform said electrical signal to said second coil by the continuous mutual induction maintained between said coils during rotor rotation and detection means connected to said second coil for producing an output signal proportional to the detected physical characteristic of said rotor.

2. A signal transmitting system for a dynamoelectric machine according to claim 1 wherein said connecting means include signal processing means and further including a third coil formed of a plurality of turns of an electrical conductor wound in a closed loop, said third coil being laid flat upon said substantially cylindrical rotor surface in co-planar disposition with said first coil, power supply means connected to said second coil, and means connecting said third coil to said signal processing means.

3. A signal transmitting system for a dynamoelectric machine comprising first and second surfaces juxtaposed in axially spaced planes perpendicularly orientated relative to the axis of said machine, one said surface being connected to the rotor of said machine to produce rotary motion between said first and second surfaces, a first coil formed of a plurality of turns of a conductor wound in the form of complete loops, said first coil being laid flat on said first surface with two opposite sides of the coil being concentrically disposed about said machine axis as radially displaced arcs, a second coil formed of a plurality of turns of a conductor wound in the form of complete loops, said second coil being laid flatwise on said second surface with two opposite sides of the coil being concentrically disposed about said machine axis as radially displaced arcs, the relative size and the arcuate span of said first coil in relation to said second coil being such that at least a minimum amount of mutual induction is continuously maintained between said coils during rotation of said first coil relative to said second coil, means mounted upon said rotor for generating an electric signal indicative of a pre-determined physical characteristic of said rotor, means connecting said signal generating means to the rotary coil to transform said electrical signal to the stationary coil by the continuous mutual induction maintained between said coils during rotor rotation and detection means connected to said stationary coil for producing an output signal proportional to the detected physical characteristic of said rotor.

* * * * *